US006297740B1

(12) United States Patent
Hill et al.

(10) Patent No.: US 6,297,740 B1
(45) Date of Patent: Oct. 2, 2001

(54) SOLAR RADIATION SENSOR

(75) Inventors: Jonathan W. Hill, Scarborough; Richard Cook, North Waterboro; Mark Cote, Springvale, all of ME (US)

(73) Assignee: Control Devices, Inc., Standish, ME (US)

(*) Notice: Subject to any disclaimer, the term of this patent is extended or adjusted under 35 U.S.C. 154(b) by 0 days.

(21) Appl. No.: 09/554,297

(22) PCT Filed: Nov. 12, 1998

(86) PCT No.: PCT/US98/24061

§ 371 Date: May 11, 2000

§ 102(e) Date: May 11, 2000

(87) PCT Pub. No.: WO99/24951

PCT Pub. Date: May 20, 1999

Related U.S. Application Data

(60) Provisional application No. 60/065,375, filed on Nov. 12, 1997.

(51) Int. Cl.[7] .................. G08B 17/12

(52) U.S. Cl. .................. 340/600; 340/584; 340/425.5; 250/203.4

(58) Field of Search .................. 340/600, 584, 340/449, 425.5; 250/200, 336.1, 203.4, 338.1; 362/183; 454/75; 236/91 C; 136/246

(56) References Cited

U.S. PATENT DOCUMENTS

| | | | |
|---|---|---|---|
| 4,629,941 | 12/1986 | Ellis et al. | 315/153 |
| 4,709,145 | 11/1987 | Spillman, Jr. | 250/227 |
| 4,760,772 | 8/1988 | Horiguchi et al. | 98/2.01 |
| 4,870,264 | 9/1989 | Beha | 250/209 |
| 4,933,550 | 6/1990 | Hegyi | 250/237 |
| 4,937,443 | 6/1990 | Smoot | 250/221 |
| 4,982,081 | 1/1991 | Schmidt | 250/208.2 |
| 5,020,424 | 6/1991 | Iida et al. | 98/2.01 |
| 5,072,106 | 12/1991 | Osawa | 250/206.1 |
| 5,117,099 | 5/1992 | Schmidt | 250/208.2 |
| 5,117,744 | 6/1992 | Zimmer et al. | 454/75 |
| 5,186,682 | 2/1993 | Iida | 454/75 |
| 5,235,178 | 8/1993 | Hegyi | 250/226 |
| 5,264,691 | 11/1993 | Hegyi | 250/203.4 |
| 5,337,802 | 8/1994 | Kajino et al. | 165/22 |
| 5,352,886 | 10/1994 | Kane | 260/216 |
| 5,416,318 | 5/1995 | Hegyi | 250/226 |
| 5,426,294 | 6/1995 | Kobayashi et al. | 250/226 |
| 5,483,060 | 1/1996 | Sugiura et al. | 250/237 R |
| 5,523,557 | 6/1996 | Bruno | 250/214.1 |
| 5,537,003 | 7/1996 | Bechtel | 315/82 |

(List continued on next page.)

FOREIGN PATENT DOCUMENTS

| | | |
|---|---|---|
| 38 21 743 A1 | 1/1990 | (DE) . |
| 42 06 142 A1 | 2/1992 | (DE) . |
| 42 15 940 A1 | 5/1992 | (DE) . |
| 43 29 983 A1 | 9/1993 | (DE) . |
| 43 02 442 A1 | 8/1994 | (DE) . |
| 43 05 446 A1 | 8/1994 | (DE) . |
| 0 529 346 B1 | 8/1992 | (EP) . |
| 0 776 777 A1 | 6/1997 | (EP) . |
| 03065422 A | 3/1991 | (JP) . |
| 05193337 A | 8/1993 | (JP) . |

*Primary Examiner*—Jeffery Hofsass
*Assistant Examiner*—Anh La
(74) *Attorney, Agent, or Firm*—Woodard, Emhardt, Naughton, Moriarty & McNett Patent and Trademark Attorneys

(57) ABSTRACT

A sensor (50) for determining the magnitude and intensity of solar radiation. The apparatus includes a diffuser (2) which provides radiation through channels **(60*a*, 60*b*, 60*c*, 60*d*) within an elongated channeled member (5) onto photodiodes (54*a*, 54*b*, 54*c*, 54*d*). Each photodiode (54*a*, 54*b*, 54*c*, 54*d*) is optically isolated from other photodiodes. The diffuser (2)** is arranged and constructed so as to receive radiation within 360 degrees of the surrounding environment.

29 Claims, 8 Drawing Sheets

105
50
100
202
200
CONTROLLER
204
75

U.S. PATENT DOCUMENTS

| | | | | |
|---|---|---|---|---|
| 5,550,667 | | 8/1996 | Schofield et al. | 359/604 |
| 5,602,384 | | 2/1997 | Nunogaki et al. | 250/203.4 |
| 5,655,832 | | 8/1997 | Pelka et al. | 362/296 |
| 5,670,774 | | 9/1997 | Hill | 250/203.4 |
| 5,676,453 | | 10/1997 | Parkyn et al. | 362/260 |
| 5,726,441 | | 3/1998 | Samukawa et al. | 250/214.1 |
| 5,783,819 | | 7/1998 | Shimoyama et al. | 250/239 |
| 5,957,375 | * | 9/1999 | West | 236/91 C |
| 6,066,850 | * | 5/2000 | Hersom | 250/342 |

* cited by examiner

SOLAR RADIATION SENSOR

CROSS REFERENCE TO RELATED APPLICATIONS

This application claims the benefit of priority to U.S. Provisional Patent Application Ser. No. 60/065,375, filed Nov. 12, 1997, and also claims priority to PCT Patent Application US98/24061, filed Nov. 12, 1998.

BACKGROUND OF THE INVENTION

The present invention relates to an apparatus for sensing the magnitude and intensity of solar radiation, especially a sensor for detecting solar radiation incident upon a vehicle which includes a controller for adjusting the air conditioning in response thereto.

Solar radiation sensors have become popular for providing sensory input into automobile air conditioning systems that include means for separately controlling different areas within the passenger compartment. Some of these sensors include only two photodiodes, and roughly separate the solar radiation load and the passenger compartment into halves. These sensors may not provide sufficient resolution of the radiation load for some consumers. Yet other radiation sensors provide four photodiodes for improved resolution of the radiation load into quadrants, but mount the photodiodes on angled surfaces. This angled mounting results in more costly and less reliable connections from the photodiodes to the corresponding conditioning circuitry. Further, some of these quadrant radiation sensors have excessive cross-talk onto one of the photodiodes from adjacent quadrants, and measure this cross-talk along with the radiation load of the correct, corresponding quadrant. This excessive cross-talk can result in poor overall system performance because the sensor includes too much averaging among the quadrants. A further drawback of some radiation sensors is the remote mounting of the conditioning circuitry from the photodiodes, with corresponding reliability problems. This latter drawback is especially apparent for those sensors which are mounted on parts of the vehicle where the sensor and conditioning circuitry cannot both be accommodated.

What is needed then is an improved solar radiation sensor. The present invention provides such a sensor in a novel and unobvious way.

SUMMARY OF THE INVENTION

One aspect of the current invention concerns an apparatus which includes a vehicle with a passenger compartment. The compartment includes an air conditioner, the air conditioner being adjustable to vary the conditioning of the air provided within the compartment. The apparatus also includes a controller for adjusting the air conditioner. There is also a radiation sensor that includes a channeled member, a diffuser, and at least four photodiodes. The channeled member defines at least four channels for transmission of radiation. The diffuser provides radiation to a single channel. Each photodiode is exposed to radiation from a single channel and produces a signal in response thereto. The controller receives the signals and adjusts the air conditioner in response to the signals.

In another aspect, the present invention concerns an apparatus comprising a channeled member, a diffuser, and a plurality of photodiodes. The channeled member defines at least four channels, each channel being substantially parallel with each other channel. The channel member has a top and a bottom. The diffuser is mounted proximate to the top of the channeled member. The diffuser is optically coupled to one channel. The plurality of photodiodes are mounted proximate to the bottom of the channeled member, each photodiode being optically coupled to a different one of the channels.

These and other objects and advantages of the present invention will be apparent from the claims, description, and drawings to follow.

DESCRIPTION OF THE PREFERRED EMBODIMENT

Figure 1:
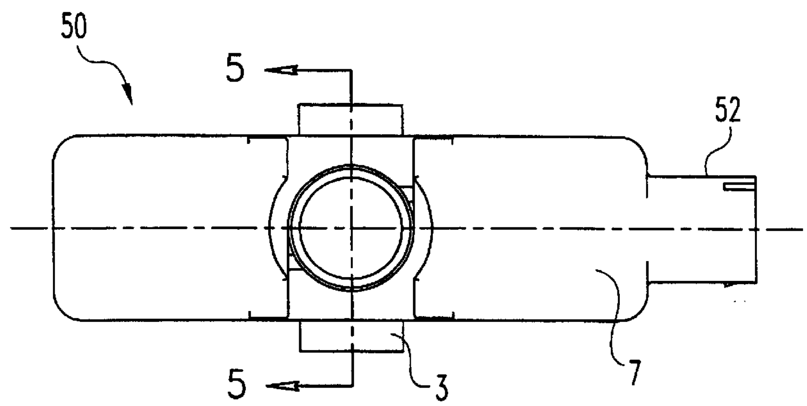
FIG. 1 is a top plan view of one embodiment of an apparatus according to the present invention.
Figure 2:
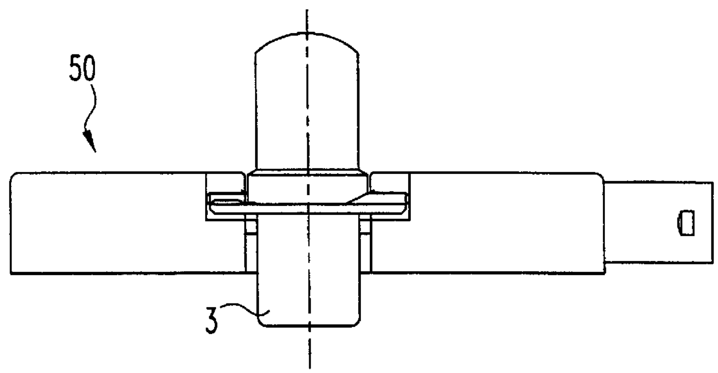
FIG. 2 is a frontal elevational view of the apparatus of FIG. 1.
Figure 3:
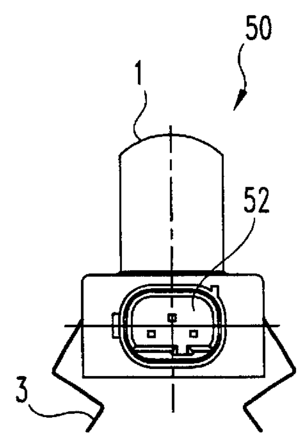
FIG. 3 is a right side elevational view of the apparatus of FIG. 1.
Figure 4:
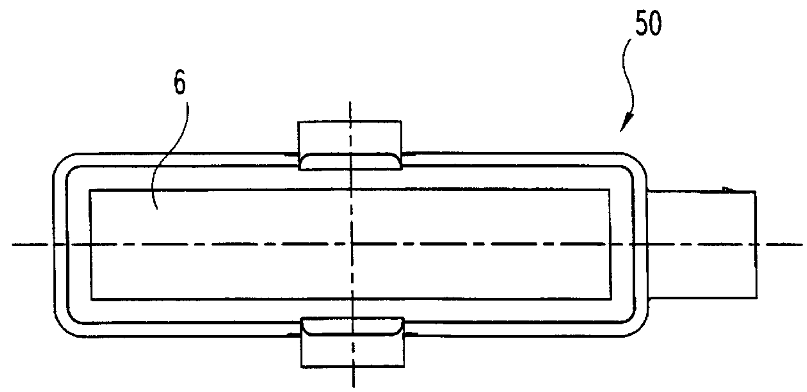
FIG. 4 is a bottom plan view of the apparatus of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a radiation-sensing apparatus which in one embodiment can determine which of four spatial quadrants the sun is in and the intensity of the sun. Electrical signals from the sensor are utilized by a controller within a vehicle to control a sub-system of that vehicle in response to the perceived location and intensity of the sun. In one embodiment of the present invention, a light-sensing apparatus 50 provides electrical signals 202 to a controller 200 of an air-conditioning system for a vehicle 204. Included herein in its entirety is U.S. Provisional Patent Application Ser. No. 60/065,375, filed Nov. 12, 1997.

In one embodiment of the present invention, the apparatus includes a diffuser with a plurality of angled facets. Each facet is optically coupled to a channel. These channels are defined within a channeled member structure. Radiation within the channel is provided to a photodiode proximate to one end of the channel, which is opposite of the end of the channel that is proximate the facet of the diffuser. Radiation striking the photodiode produces an electrical signal that is proportional to the radiation passing through the facet. In some embodiments of the present invention, the channels are polished so as to make the walls of the channel reflective and thus improve the overall transmission of radiation from the facet to the photodiode.

The photodiodes of this invention are preferably mounted within the same plane on a circuit board. The center of each diode is approximately intersected by the centerline of the corresponding channel. Thus, the channels of the channeled member structure are preferably perpendicular to the radiation-receiving surface of the photodiode. Each photodiode generally receives light from only a single quadrant based upon the angular orientation of the corresponding facet. Further, each photodiode is optically isolated from other diodes by fabricating the channeled member structure from an opaque material such that light within one channel is not transmitted to another channel. In addition, a separator at the bottom of the channeled member structure optically isolates each photodiodes from other photodiodes. This separator is cross-shaped so as to not interfere with the electrical connection of the photodiodes leading to the edge of the circuit card.

The diffuser preferably includes a plurality of generally flat faceted surfaces. Each facet provides an entry for light into a channel defined within the channeled member structure and optically coupled to the facet. Each facet is preferably inclined from about 30 degrees to about 60 degrees relative to the centerline of the corresponding channel. In addition, each faceted surface is angled relative to each other faceted surface. In one embodiment of the preferred invention, this facet to facet angle is about 90 degrees. Preferably, each facet also extends for an arc of about 90 degrees. Preferably, each facet collects radiation in proportion to the cosine of the angle of incidence of the radiation. For example, there is peak collection by the facet of radiation perpendicular to the plane of the facet. There would be about 70% collection of radiation that falls 45 degrees incident to the plane. In this embodiment, a four-faceted sensor apparatus would collect radiation from 360 degrees surrounding the sensor apparatus.

The present invention also includes those embodiments in which the diffuser does not include a plurality of planar facets. For example, each channel could include a separate diffuser which could be planar or have rounded contours in shape. As another example, some embodiments of the present invention include a single diffuser that has a hemispherical, bubble, or bullet shape.

Although what has been shown and described is an apparatus with four light-transmitting channels arranged compactly in a 2×2 array, the present invention also contemplates other configurations. For example, the four channels could be arranged in a linear fashion, or 1×4 array, with each channel having a facet receiving radiation from a different quadrant of the surroundings. Also, the present invention contemplates channeled member structures with more than four channels. For example, there can be embodiments in which there are, for example, six channels, with each channel receiving light from a different angular portion of the surroundings. As a further example, a five-channel structure is contemplated, wherein a fifth centered channel receives light from a facet that is generally perpendicular to the center line of the corresponding fifth channel.

FIGS. 1–4 show various orthogonal views of an apparatus according to one embodiment of the present invention. FIG. 1 shows a solar radiation-sensing apparatus 50. Apparatus 50 includes a protective body 7 fabricated from polyester. Apparatus 50 is useful for sensing the location and intensity of a source of radiation such as the sun, and determining which of four quadrants the source is in. An electrical connector for providing power to apparatus 50 and also for transmitting signals from apparatus 50 is provided on one end of body 7. A retaining clip 3, preferably fabricated from stainless steel, is generally centered on body 7.

Figure 5:
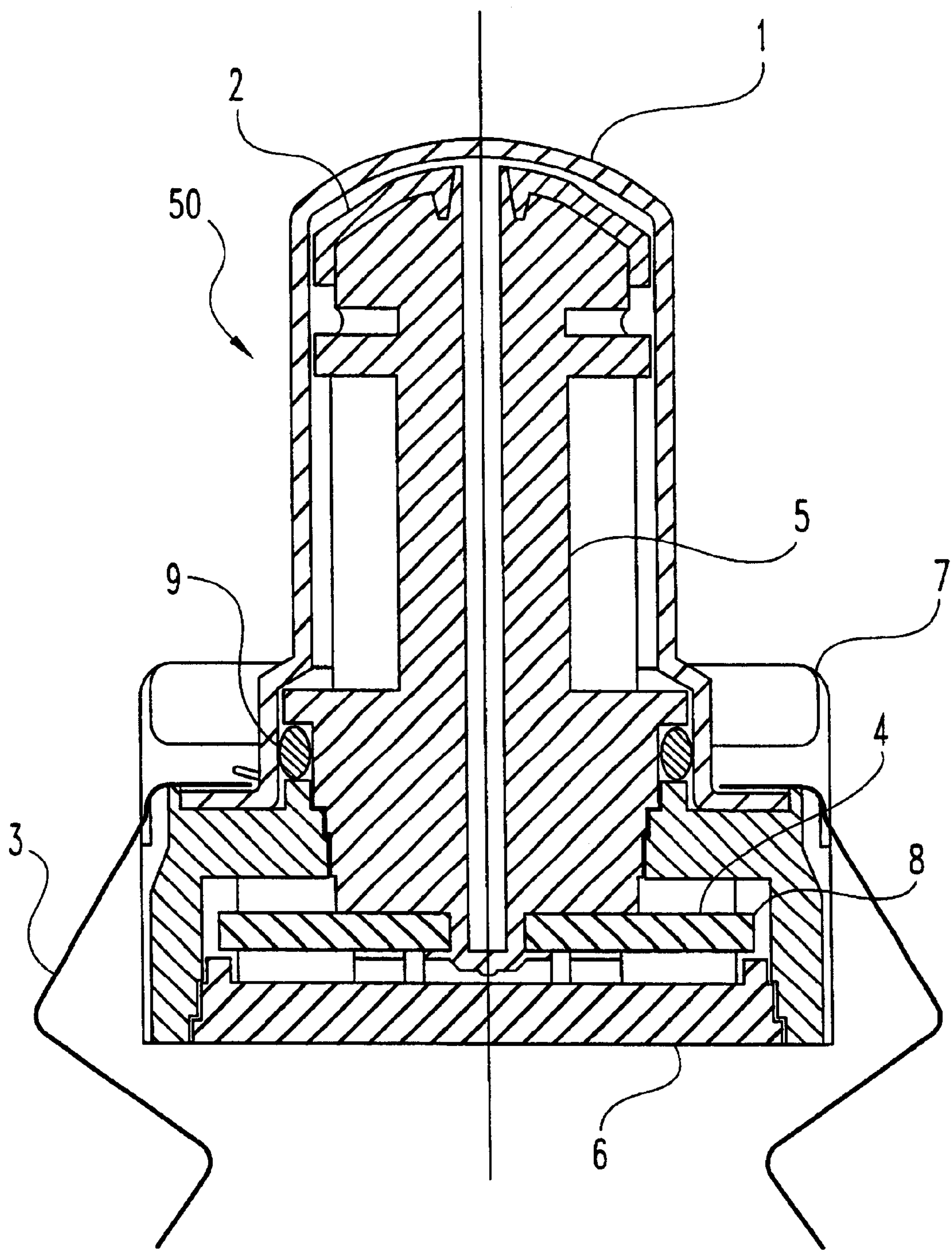
FIG. 5 is a cross-sectional view of the apparatus of FIG. 1 as taken along line 5—5 of FIG. 1.

FIG. 5 is a cross-sectional view of the apparatus of FIG. 1 as taken along 5—5 of FIG. 1. Apparatus 50 includes a translucent cap 1 which permits the passage of light to the interior of apparatus 50 and also, in conjunction with o-ring 9 and body 7, provides a weather tight seal for the internal elements of apparatus 50. In one embodiment of the present invention cap 1 is fabricated from a polycarbonate material. Located underneath cap 1 is translucent diffuser 2. Diffuser 2 is preferably fabricated from a material such as Delryn 527, with natural color, and rated UV NC010. Located underneath diffuser 2 is channeled member 5, which is preferably fabricated from an opaque material such as a polyester. However, the present invention also contemplates other materials, including the use of metals such as aluminum or steel, as well as other opaque materials, for the channeled member 5.

Located underneath channeled member 5 is a generally planar circuit board 8 preferably fabricated from an epoxy resin and containing various electronic circuits and devices, including four photodiodes 54. The bottom of body 7 is covered with a body cover 6. Both body cover 6 and body 7 are fabricated from opaque materials such as a polyester.

Figure 6A:
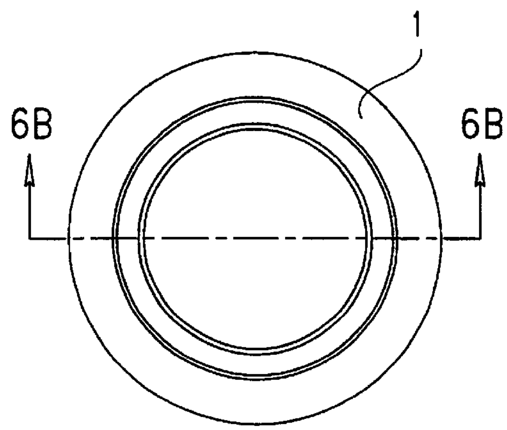
FIG. 6A is a top plan view of a cap according to one embodiment of the present invention.
Figure 6B:
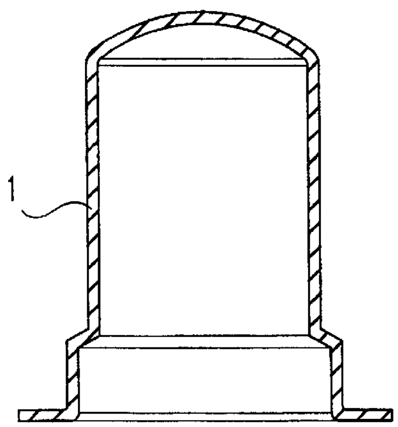
FIG. 6B is a cross-sectional view of the cap of FIG. 6A taken along line 6B—6B of FIG. 6A.
Figure 6C:
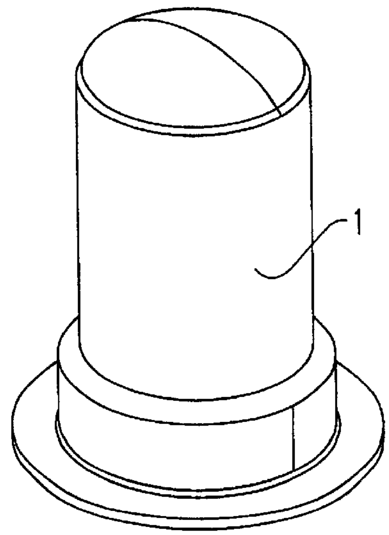
FIG. 6C is a top and side perspective view of the cap of FIG. 6A.

FIGS. 6A, B and C show various views of a cap according to one embodiment of the present invention. In one embodiment of the present invention cap 1 is fabricated from a polycarbonate material such as GE LEXAN 143 or equivalent. Cap 1 protects portions of apparatus 50, and preferably also hides the internal components of apparatus 50 from view. Cap 1 preferably appears opaque, but transmits infrared energy. Cap 1 preferably does not appreciably affect the angular response of apparatus 50. The surfaces of cap 1 and the surfaces of diffuser 2 are finished to SPI/SPE No.2, primarily for cosmetic reasons.

Figure 7A:
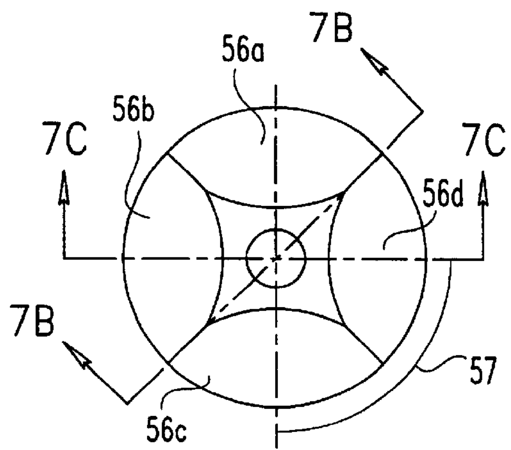
FIG. 7A is a top plan view of a diffuser according to one embodiment of the present invention.
Figure 7B:
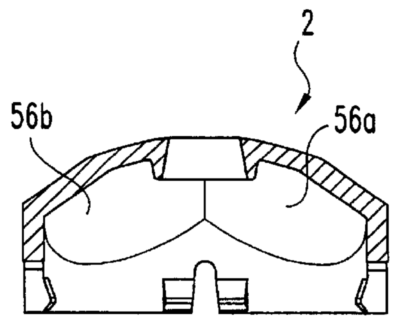
FIG. 7B is a cross-sectional view of the diffuser of FIG. 7A as taken along line 7B—7B of FIG. 7A.
Figure 7C:
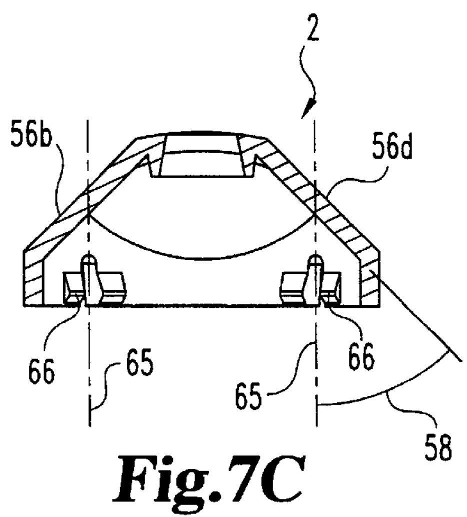
FIG. 7C is a cross-sectional view of the diffuser of FIG. 7A as taken along line 7C—7C of FIG. 7A.
Figure 7D:
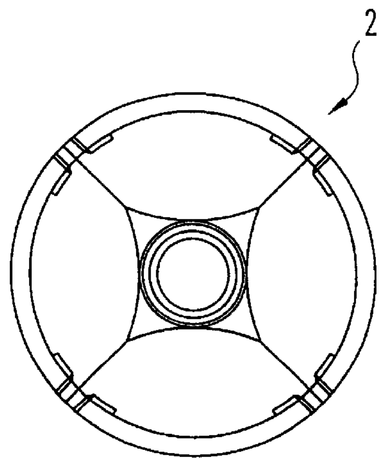
FIG. 7D is a bottom plan view of the diffuser of FIG. 7A.

FIGS. 7A, B, C and D, show various views of a diffuser according to one embodiment of the present invention. Diffuser 2 preferably includes four facets 56*a, b, c,* and *d.*

Each facet 56 preferably occupies about a 90 degree arc of diffuser 2. Each facet 56 is preferably inclined at an angle 58 relative to the centerline 65 of the corresponding channel of the tower. In the preferred embodiment this inclined angle is about 45 degrees. However, the present invention also contemplates inclined angles between about 30 degrees and 60 degrees from the corresponding centerline. In one preferred embodiment of the present invention each facet 56 has a generally planar surface, and the planar surface of each facet is generally perpendicular to the planar surface of each other facet. The four facets 56*a*, 56*b*, 56*c*, and 56*d* of diffuser 2 thus point toward four different quadrants of the area above radiation-sensing apparatus 50.

Figure 8A:
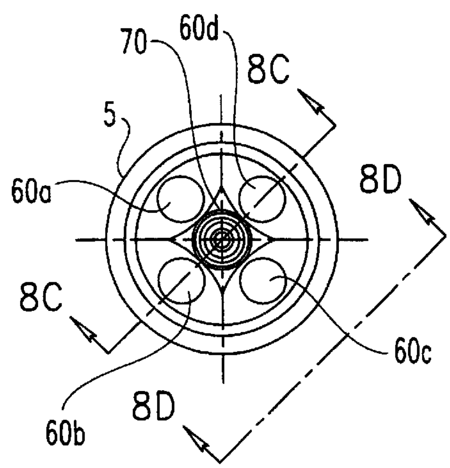
FIG. 8A is a top plan view of a channeled member according to one embodiment of the present invention.
Figure 8B:
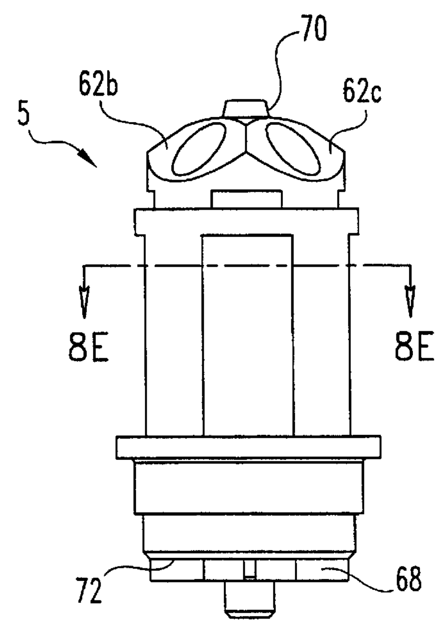
FIG. 8B is a side elevational view of the channeled member of FIG. 8A.
Figure 8C:
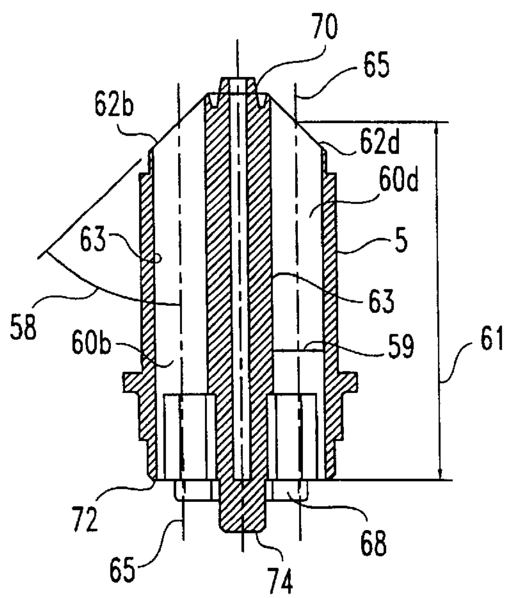
FIG. 8C is a cross-sectional view of the channeled member of FIG. 8A as taken along line 8C—8C of FIG. 8A.
Figure 8D:
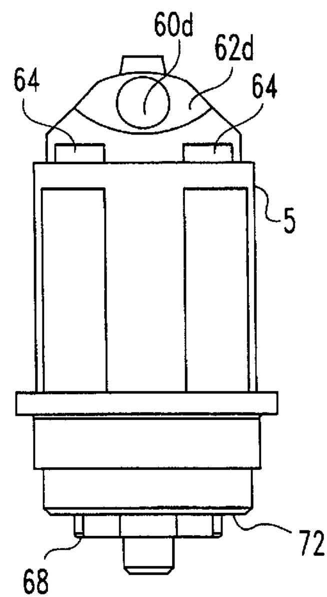
FIG. 8D is a side elevational view of the channeled member of FIG. 8A as viewed from line 8D—8D of FIG. 8A.

FIGS. 8A, B, C, D, and E show various views of an elongated channeled member structure according to one embodiment of the present invention. Channeled member 5 preferably incorporates four generally cylindrical channels 60*a, b, c,* and *d*, which receive light from a corresponding facet 56*a, b, c,* or *d*. Each channel 60*a, b, c,* or *d* includes a corresponding upper face 62*a, b, c,* or *d*, which is inclined relative to centerline 65 of the channel about the same angle of inclination as facets 56. However, the present invention also includes those embodiments in which the upper face of a channel is inclined at an angle different than the angle of the facet, including faces that are generally perpendicular to the centerline of the channel.

Figure 8E:
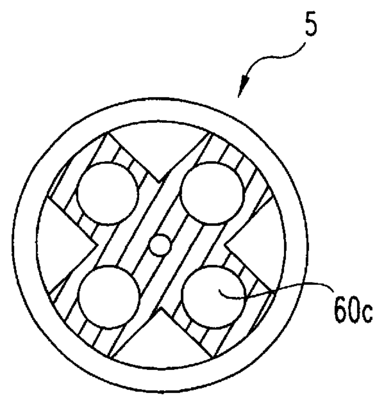
FIG. 8E is a cross-sectional view of the channeled member structure of FIG. 8B as taken along line 8E—8E of FIG. 8B.

As seen best in FIGS. 8A and 8E, channels 60 are preferably arranged in a 2×2 array, with each centerline 65*a, b, c,* or *d*, of a channel 60*a, b, c,* or *d*, being parallel to the other centerlines of other channels. This preferred arrangement of substantially parallel cylindrical channels both reduces manufacturing costs and also enhances throughput of radiation from the diffuser, in comparison to designs that include angled or bent channels. In the preferred orientation of radiation-sensing apparatus 50, channels 60 are substantially vertical when apparatus 50 is installed on a vehicle. Diffuser 2 interfaces with and is preferably in contact with top 70 of channeled member 5.

The interior walls 63 of channel 60 are preferably finished to a level of Society of Plastics Industry/Society of Plastics Engineers SPI/SPE No. 2. The level 2 finish is useful for improving the reflectance of the channel walls and the transmission of light through channels 60 to the photodiodes. This smooth, reflective finish for the interior walls of channels 60 is helpful in permitting a reduction in the amplification of the photodiode signals which would otherwise be needed. Also, having a reflective finish to the interior walls permits channels 60 to be increased in length for the same amplification, the increased length permitting more options in the placement of sensor 50 on a vehicle. Preferably, the outer surfaces of channeled member 5 are generally finished to SPI/SPE No. 3.

Diffuser 2 is indexed to channeled member 5 such that each facet 56*a, b, c,* and *d*, is generally aligned with a single channel 60*a, b, c,* or *d*. This indexing is maintained by the interface of a plurality of female indices 64 of channeled member 5 that accept a plurality of male indices 66 on diffuser 2. As described, each facet is optically coupled to one channel. Light energy reaching facet 56*b* for example will be transmitted into channel 60*b*, with little crossover of radiation into other channels.

Figure 9A:
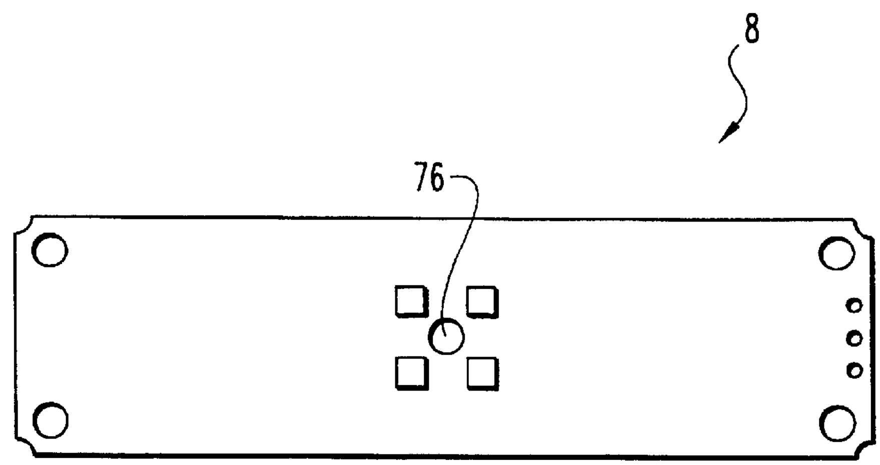
FIG. 9A is a top plan view of a circuit card and photodiodes according to one embodiment of the present invention.
Figure 9B:
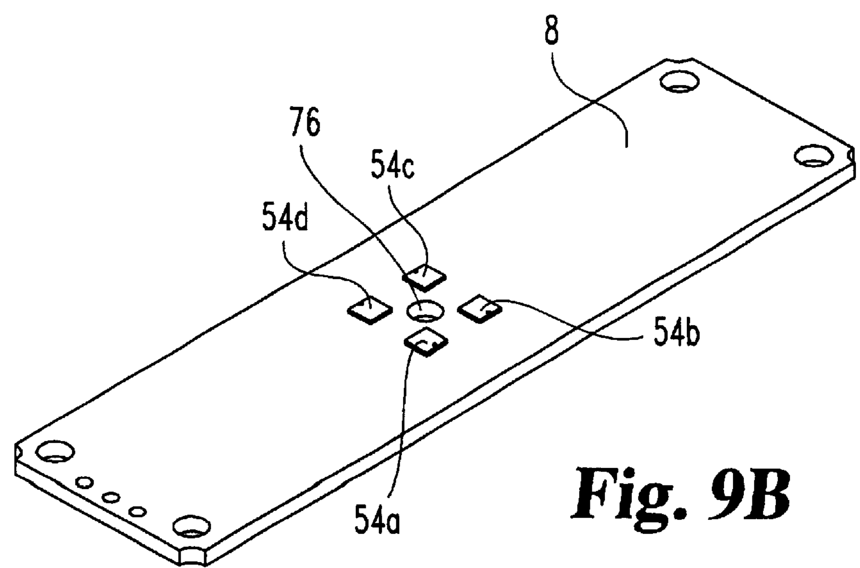
FIG. 9B is a perspective view of the circuit card of FIG. 9A.

FIGS. 9A and B are views of a generally planar circuit card according to one embodiment of the present invention. Circuit card 8 as shown in FIGS. 9A and 9B has on it four photodiodes 54*a, b, c* and *d*, arranged to correspond to the arrangement of the channels 56. The photodiodes 54 are mounted within a single plane, thus improving manufacturability and reliability, and lowering sensor cost. Other electrical components including resistors, transistors, capacitors, integrated circuits, and other devices are also mounted to circuit card 8. Many of these components are depicted schematically in FIG. 11. For sake of clarity, these other components are not shown in FIGS. 9A and 9B.

Circuit card 8 defines a locating hole 76 in the middle of photodiodes 54. Pin 74 of channeled member 5 fits within locating hole 76, and assists in aligning a channel with a corresponding photodiode. Light transmitted through a channel 60 is transmitted and is incident upon a single photodiode 54. For example, light transmitted through facet 56*a* is transmitted through channel 60*a* and falls incident onto photodiode 54*a*. A cross shaped separator 68 at the bottom 72 of channeled member 5 insures that light transmitted along one channel does not excite any photodiode except for the photodiode optically coupled to the particular channel. Each of the photodiodes 54 are silicon photodiodes in a preferred embodiment of the present invention. In that embodiment photodiode 54 is equivalent to a model ET0106 pin silicon photodiode provided by East Texas Integrated Circuits.

Figure 11:
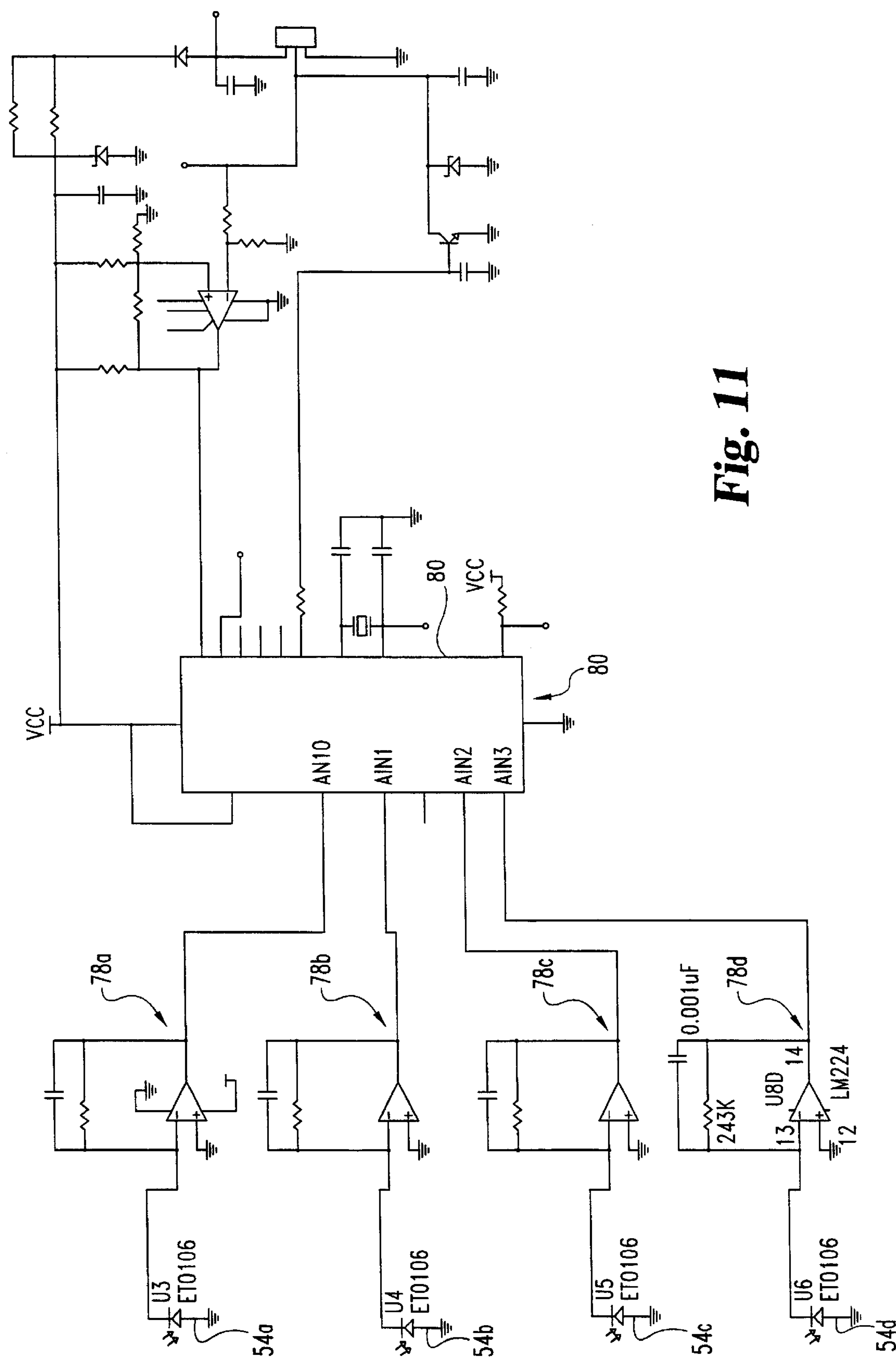
FIG. 11 is a schematic diagram of a circuit according to one embodiment of the present invention.

FIG. 11 is a schematic diagram of a circuit useful with the present invention. Each photodiode 54A, B, C and D, is electrically connected to a corresponding buffer amplifier 78. The output of amplifiers 78A, B, C or D is provided to microprocessor 80. In one embodiment of the present invention, the other circuitry shown on FIG. 11, known to those of ordinary skill in the art, is useful for operation of microprocessor 80.

Figure 10:
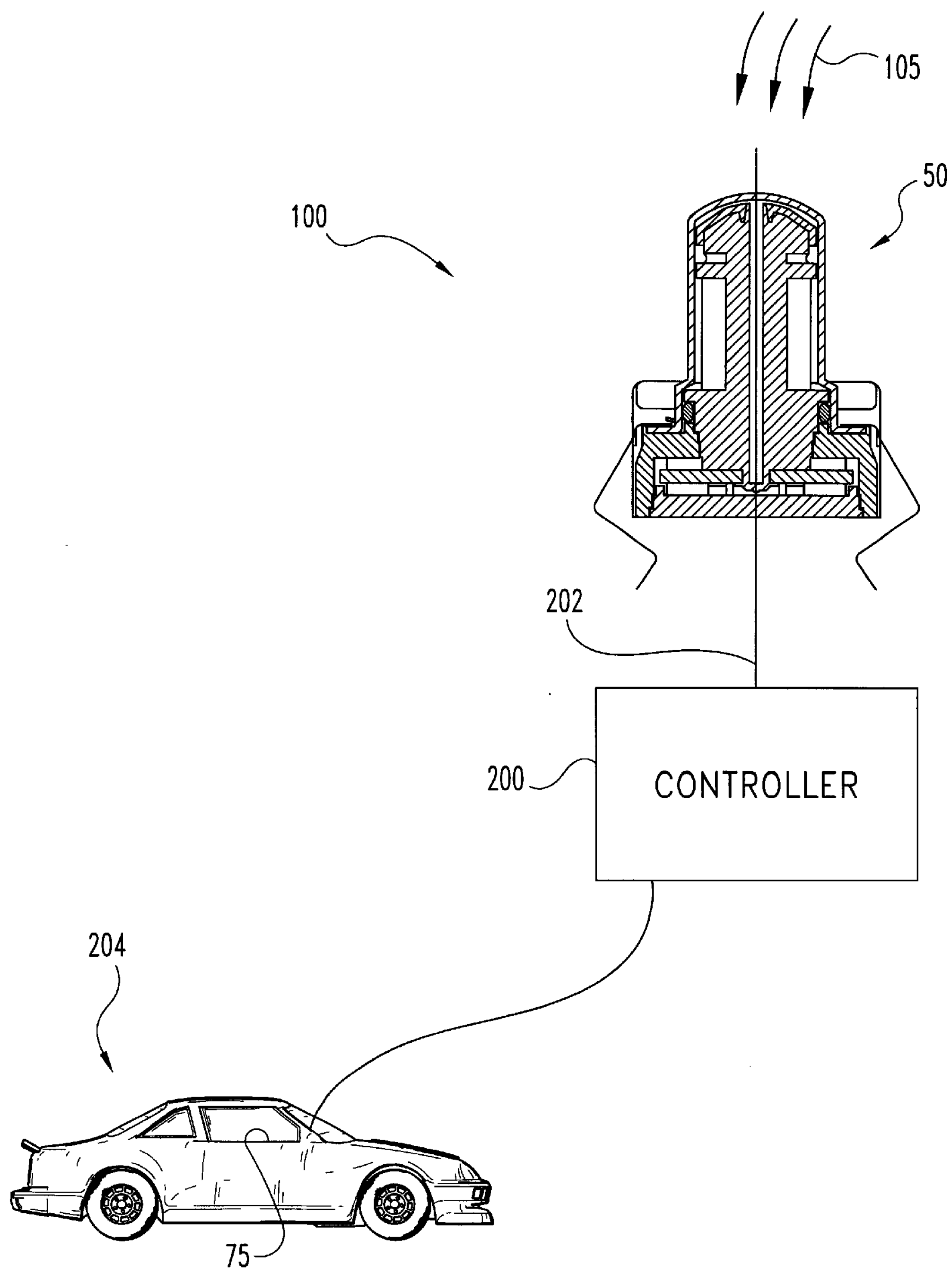
FIG. 10 is a schematic view of a system according to one embodiment of the present invention.

FIG. 10 schematically depicts a system in which a sensor 50 mounted to a vehicle 204 provides signals 202 to a controller 200 which operates the air conditioning system of a vehicle 204. Radiation 105 falling incident upon a diffuser 2 is provided through a facet into a channel and onto a photodiode. As an example, apparatus 50 can be oriented such that facet 56*a* is toward the left front of the vehicle, and facet 56*c* is toward the right rear of the vehicle. With such an orientation for apparatus 50, when the sun is in the quadrant of sky toward the left front of the vehicle, photodiode 54*a* will produce a stronger output than photodiode 54*c*. The corresponding electrical signals from photodiodes 54*a* and 54*c* are transmitted to controller 200. Controller 200 adjusts the air conditioning of the vehicle so as to account for the increased heating of passenger compartment 75 on the left front side of the vehicle, and can also adjust the air conditioning to the right rear area of passenger compartment 75 to account for the decreased radiation heating.

Each channel 60 is made of a length 61 and a diameter 59. In one preferred embodiment, length 61 is established so as to permit apparatus 50 to be installed through an aperture, such as an aperture defined in an air intake grille of vehicle 204. In such an installation, the top, rounded portion of cap 1 proximate to diffuser 2 would protrude through the grille and be exposed to radiation received from the sun. The generally cylindrical portion of cap 1 would pass through the aperture in the grille. The body 7 of apparatus 50 would be located underneath the grille.

In a preferred embodiment, the combination of an angled, faceted diffuser providing light through a 2×2 array of channels onto a corresponding planar array of photodiodes results in an apparatus that is low cost and reliable. By mounting the photodiodes in planar fashion onto the same circuit board that includes the photodiode conditioning circuitry, the long lead wires used in some radiation sensors to connect the photodiodes to the conditioning circuitry are eliminated. The elimination of long lead wires results in both lower manufacturing costs and improved reliability during use. By coupling the diffuser to the photodiodes through an elongated channeled member, the radiation-collecting diffuser can be located where the radiation can be best collected, while permitting the photodiodes and conditioning circuits to be located in close proximity to the diffuser, yet unobtrusively mounted so as to not spoil the aesthetics of the vehicle. Software for conditioning the signals of the photodiodes is well within the ordinary skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:

a vehicle with a passenger compartment, said compartment including an air conditioner, said air conditioner being adjustable to varying the conditioning of the air provided within said compartment;

a controller for adjusting said air conditioner; and a radiation sensor, said sensor including a channeled member, a diffuser, and at least four photodiodes, said channeled member defining at least four parallel channels for transmission of radiation, each said channel having two open ends and being enclosed between the two ends, one end receiving radiation from said diffuser, each said photodiode being exposed to radiation from the other end of a single said channel and producing a signal in response thereto;

wherein said controller adjusts said air conditioner in response to said signals.

2. The apparatus of claim 1 wherein each channel has a centerline, said diffuser includes at least four facets, and each facet is inclined about thirty to sixty degrees from the centerline.

3. The apparatus of claim 2 wherein each facet is inclined about forty five degrees from the centerline.

4. The apparatus of claim 1 wherein said channeled member is fabricated from a material that is substantially opaque.

5. The apparatus of claim 2 wherein each said facet has a substantially planar surface.

6. The apparatus of claim 5 wherein each planar surface is generally perpendicular to each other planar surface.

7. The apparatus of claim 1 wherein said channeled member defines four channels, each channel being generally parallel to each other channel.

8. The apparatus of claim 1 which further comprises a substantially planar circuit board, wherein said photodiodes are mounted on said circuit board within a single plane.

9. An apparatus comprising:

a channeled member defining at least four channels, each said channel being substantially parallel with each other said channel, each said channel having two open ends and being enclosed between the two ends, said channeled member having a top and a bottom;

a diffuser mounted proximate to the top of said channeled member, said diffuser being optically coupled to one end of said channels;

a plurality of photodiodes mounted proximate to the bottom of said channeled member, each said photodiode being optically coupled to the other end of a different one of said channels.

10. The apparatus of claim 9 wherein said diffuser includes a facet for each said channel, each said facet has a generally planar surface, and the surface of each said facet is generally perpendicular to the surface of each other said facet.

11. The apparatus of claim 9 wherein each said channel has a centerline and said channeled member defines an upper face for each said channel, each said upper face being inclined between 30 degrees and 60 degrees from the corresponding channel centerline.

12. The apparatus of claim 9 which further comprises a substantially planar circuit board, wherein said photodiodes are mounted on said circuit board within a single plane.

13. The apparatus of claim 9 which further comprises a protective cap which covers portions of said diffuser and said channeled member.

14. An apparatus comprising:

a channeled member defining at least four channels, said channeled member having a top and a bottom, each said channel having first and second open ends;

a diffuser mounted proximate to the top of said channeled member, said diffuser having a facet for each one of said at least four channels, each said facet providing radiation to the first end of a different one of said channels, the radiation being transmitted within said channel; and a plurality of photodiodes mounted proximate to the bottom of said channeled member, each said photodiode receiving radiation from the second end of a different one of said channels.

15. The apparatus of claim 14 wherein said channeled member is fabricated from a material that is substantially opaque, each said channel is enclosed between the first and second open ends, and each said photodiode is optically isolated from three said channels.

16. The apparatus of claim 15 wherein each said channel is generally cylindrical, and each said channel is generally parallel to each other said channel.

17. The apparatus of claim 16 wherein the enclosed channels of said channeled member are arranged in a two by two array.

18. The apparatus of claim 14 wherein each said channel has a centerline and the first open end of each said channel includes an upper face inclined between 30 degrees and 60 degrees from the channel centerline.

19. The apparatus of claim 18 wherein each said facet has a generally planar surface inclined between 30 degrees and 60 degrees from the centerline of the corresponding channel.

20. The apparatus of claim 19 wherein each facet is inclined about forty-five degrees from the centerline of the corresponding channel.

21. The apparatus of claim 14 which further comprises a substantially planar circuit board, wherein said photodiodes are mounted on said circuit board within a single plane.

22. The apparatus of claim 21 which further comprises a separable protective cap which covers portions of said diffuser and said channeled member.

23. An apparatus for determining the position of the sun, comprising:

a channeled member defining at least four channels, each said channel being substantially parallel to each other said channel, each said channel having first and second open ends and being enclosed therebetween;

a diffuser mounted proximate to the first open end of each said channel, said diffuser providing radiation from the sun to each said channel; and at least four photodiodes, each said photodiode being mounted proximate to the second open end of a different one of said channels, each said photodiode receiving radiation from the sun from the one of said channels.

24. The apparatus of claim 23 wherein each said channel is generally cylindrical.

25. The apparatus of claim 24 wherein said channeled member is fabricated from a material that is substantially opaque, said enclosed channels of said channeled member are arranged in a two by two array, and each said photodiode is optically isolated from three said channels.

26. The apparatus of claim 25 wherein each said channel has a centerline and the first open end of each said channel includes an upper face inclined between 30 degrees and 60 degrees from the channel centerline.

27. The apparatus of claim 23 wherein said diffuser includes a facet for each one of said at least four channels, each said facet providing radiation to the first end of a different one of said channels, each said facet has a generally planar surface inclined between 30 degrees and 60 degrees from the centerline of the corresponding channel.

28. The apparatus of claim 27 wherein each facet is inclined about forty-five degrees from the centerline of the corresponding channel.

29. The apparatus of claim 23 which further comprises a substantially planar circuit board, wherein said photodiodes are mounted on said circuit board within a single plane, and a separable protective cap which covers portions of said diffuser and said channeled member.

* * * * *